United States Patent
Citterio et al.

(10) Patent No.: US 12,138,899 B2
(45) Date of Patent: Nov. 12, 2024

(54) BALLISTIC LAMINATE COMPRISING AT LEAST TWO PAIRS OF UNIDIRECTIONAL LAYERS, WITH FIBERS PARALLEL TO EACH OTHER AND SEPARATED BY A CONNECTING LAYER

(71) Applicant: SOCIETA' PER AZIONI FRATELLI CITTERIO, Monza (IT)

(72) Inventors: Filippo Citterio, Monza (IT); Giorgio Celeste Citterio, Monza (IT)

(73) Assignee: SOCIETA' PER AZIONI FRATELLI CITTERIO, Monza (IT)

( * ) Notice: Subject to any disclaimer, the term of this patent is extended or adjusted under 35 U.S.C. 154(b) by 0 days.

(21) Appl. No.: 17/614,217

(22) PCT Filed: May 27, 2020

(86) PCT No.: PCT/EP2020/064691
§ 371 (c)(1),
(2) Date: Nov. 24, 2021

(87) PCT Pub. No.: WO2020/239831
PCT Pub. Date: Dec. 3, 2020

(65) Prior Publication Data
US 2022/0212436 A1    Jul. 7, 2022

(30) Foreign Application Priority Data

May 28, 2019   (IT) .................. 102019000007419

(51) Int. Cl.
*B32B 5/12*     (2006.01)
*B32B 3/26*     (2006.01)
(Continued)

(52) U.S. Cl.
CPC ............... *B32B 5/12* (2013.01); *B32B 3/266* (2013.01); *B32B 5/022* (2013.01); *B32B 5/024* (2013.01);
(Continued)

(58) Field of Classification Search
CPC .. B32B 5/12; B32B 7/09; B32B 3/266; B32B 5/022; B32B 2260/023; B32B 2260/04;
(Continued)

(56) References Cited

U.S. PATENT DOCUMENTS 5,132,167 A * 7/1992 Prato .................. F41H 5/0485
                                                             442/164
5,185,195 A * 2/1993 Harpell .................. B32B 7/09
                                                             2/2.5
(Continued)

FOREIGN PATENT DOCUMENTS

CN      207263031       4/2018
WO      WO-2008/130391 A2    10/2008

OTHER PUBLICATIONS

EP Examination Report on EP 20727658.5 dated Sep. 11, 2023.
(Continued)

*Primary Examiner* — Joanna Pleszczynska
(74) *Attorney, Agent, or Firm* — Foley & Lardner LLP

(57) ABSTRACT

The present invention relates to a structure for the construction of ballistic protection that combines high projectile-stopping and trauma-reduction performance with high flexibility. A ballistic laminate comprising at least two pairs of unidirectional layers, with fibers parallel to each other, separated by a connecting layer, is produced. In a preferred embodiment, the ballistic structure includes a plurality of unidirectional ballistic yarn sublaminates. Each sublaminate comprises at least two unidirectional ballistic layers whose fibers are substantially parallel, i.e. oriented in the same (Continued)

direction: the two ballistic layers with parallel fibers are not in direct contact with each other but are separated (and held together) by a layer consisting, for example, of a film which is also adhesive. The sublaminates are then coupled together so that the unidirectional fibers of each sublaminate are substantially perpendicular to those of the adjacent sublaminate.

12 Claims, 3 Drawing Sheets

(51) Int. Cl.
| | |
|---|---|
| *B32B 5/02* | (2006.01) |
| *B32B 5/08* | (2006.01) |
| *B32B 7/09* | (2019.01) |
| *B32B 7/12* | (2006.01) |
| *B32B 27/12* | (2006.01) |
| *B32B 27/32* | (2006.01) |
| *B32B 27/34* | (2006.01) |
| *B32B 27/36* | (2006.01) |
| *B32B 27/40* | (2006.01) |
| *B32B 37/10* | (2006.01) |

(52) U.S. Cl.
CPC ............... *B32B 5/028* (2013.01); *B32B 5/08* (2013.01); *B32B 7/09* (2019.01); *B32B 7/12* (2013.01); *B32B 27/12* (2013.01); *B32B 27/32* (2013.01); *B32B 27/34* (2013.01); *B32B 27/36* (2013.01); *B32B 27/40* (2013.01); *B32B 37/10* (2013.01); *B32B 2250/20* (2013.01); *B32B 2260/023* (2013.01); *B32B 2260/046* (2013.01); *B32B 2262/0253* (2013.01); *B32B 2262/0261* (2013.01); *B32B 2262/0276* (2013.01); *B32B 2262/0292* (2013.01); *B32B 2262/101* (2013.01); *B32B 2262/106* (2013.01); *B32B 2262/14* (2013.01); *B32B 2270/00* (2013.01); *B32B 2307/54* (2013.01); *B32B 2307/56* (2013.01); *B32B 2307/72* (2013.01); *B32B 2323/04* (2013.01); *B32B 2377/00* (2013.01); *B32B 2571/02* (2013.01)

(58) Field of Classification Search
CPC ........ B32B 2260/021; B32B 2260/046; B32B 2571/02
See application file for complete search history.

(56) References Cited

U.S. PATENT DOCUMENTS

| | | | |
|---|---|---|---|
| 2012/0088062 | A1 | 4/2012 | Chiou |
| 2012/0312151 | A1 | 12/2012 | Patel |
| 2016/0377387 | A1 | 12/2016 | Chen et al. |
| 2018/0361682 | A1* | 12/2018 | Mortimer ............... B29B 15/12 |

OTHER PUBLICATIONS

International Search Report and Written Opinion on PCT Appln. PCT/EP2020/064691 dated Sep. 29, 2020.

Chinese Office Action on CN Patent Appln No. 202080053006.9, dated Aug. 30, 2024 (4 pages).

Israeli Notice of Deficiencies for IL Patent Application 288366, mailed Jul. 18, 2024 (4 pages).

* cited by examiner

«BALLISTIC LAMINATE COMPRISING AT LEAST TWO PAIRS OF UNIDIRECTIONAL LAYERS, WITH FIBERS PARALLEL TO EACH OTHER AND SEPARATED BY A CONNECTING LAYER»

CROSS-REFERENCE TO RELATED APPLICATIONS

This is a U.S. National Stage Application under 35 U.S.C. § 371 of International Patent Application No. PCT/EP2020/064691, filed on May 27, 2020, which claims priority to Italian Patent Application no. 102019000007419, filed on May 28, 2019, the disclosure of each of which is incorporated herein by reference in their entireties.

TECHNICAL FIELD

The present invention relates to a structure for the construction of ballistic protection that combines high bullet-stopping and trauma-reduction performance with high flexibility.

PRIOR ART

The scope of the invention is that of ballistic structures composed of fibers or tapes (hereinafter referred to as fibers) in the form of assemblies.

The first ballistic protections were produced by superimposing fabrics with a traditional structure (warp-weft type) in which a weft thread crosses a warp thread; although some small modifications have been applied over time, this type of fabric always has two sets of fibers (usually perpendicular to each other) that also cross with some weaves, i.e. different types of crossing between the threads themselves. These known textile structures have some disadvantages:

- reflection nodes of the sonic wave responsible for absorption of the energy of the incident projectile are created at the intersection points between the fibers; this reflection causes the fibers to be stressed by the forces of both the incident and the reflected waves with consequent weakening of the structure;
- the yarns used for the weft are woven into the fabric by a process (e.g. "defiler") that imposes torsional twist on the yarn that causes the fibers to be out of parallel with the direction of the yarn; this misalignment decreases the yarn's ballistic resistance.

A net improvement has been achieved through the production of unidirectional fabrics; these fabrics are composed of layers of yarn aligned and parallel to each other, partly or totally impregnated with matrices of different kinds.

The final structure of unidirectional (UD) fabrics comprises the overlapping of several unidirectional layers of fibers in which each layer is superimposed at an angle of usually about 90° to the previous layer. In this case, cohesion of the structure is ensured through the use of matrices/resins, as there are no crossings between yarns belonging to the same layer.

This latter structure has the undoubted advantage of not having crossings between the yarns, enabling the sonic wave to be absorbed without reflections.

Likewise these structures have the disadvantage of being deformable because they must rely on the cohesion between the layers through the use of matrices since they do not have physical crossings between the yarns.

Because of this deformability, the outer surfaces of the fabric must be protected by additional elements (e.g. film) which also ensure acceptable abrasion resistance during use.

A further ballistic improvement has been achieved by using multi-axial fabrics in which the ballistic yarns are arranged unidirectionally in overlapping layers at an angle to each other and are then sewn by means of a knitting process; in higher performance versions the adjacent layers of thread arranged perpendicularly to each other are stabilized by the presence of an additional adhesive layer (film type). It should be noted that this feature, the presence of film between the 0° layer and the 90° layer, has brought about a considerable reduction in trauma.

As mentioned above, the ballistic performance of the structures is evaluated through two main parameters: the first is the so-called V50, i.e. the speed at which 50% of projectiles are stopped by the fabric; the second relates to depth of trauma associated with the deformation (back face deformation BFD) that the ballistic structure undergoes after the projectile has been stopped. The latter value is defined by measuring the depth of the impression made in a block of plasticine on which the ballistic package is placed during the ballistic impact test, usually with reference to a standard, e.g. NiJ04.

In order to contain this trauma, it has been found that the introduction of an adhesive film between the layers of fibers arranged perpendicularly to each other, including in UD and multi-axial structures, strongly reduces trauma without significant loss of V50. Regardless of the ballistic structure, it is known that the part responsible for stopping the projectile is mainly the fiber; the most widely used fibers at present are those based on polyethylene, polypropylene, glass, carbon, aramid type fibers including in co-polymer versions, PVA fibers, natural fibers such as hemp, etc.

In recent years fibers characterized by very high elastic modulus and tensile strength values have been placed on the market; for example those based on UHMWPE (ultra high molecular weight polyethylene) which have tensile strength of over 40 cN/dtex and a modulus of more than 135 GPa; typically these are about 30% more resistant than the best aramid-based fibers.

However, resins, especially film types, have not undergone the same development in terms of mechanical properties.

Thus attempting to use the same fiber/matrix textile forms of construction with higher-performance fibers and matrices which are not of higher performance does not lead to the desired benefits.

In particular, a textile structure is able to absorb energy through a formula developed by Cunniff (Cunniff, P. M. "Dimensional Parameters for optimization of textile-based body armor systems" in Proceedings of the 18th International Symposium of Ballistics, San Antonio, TX, USA 15-19 Nov. 1999), shown below, which shows that the absorbed energy is directly proportional to the maximum elastic energy that can be stored by the fiber per unit mass and the speed of the sonic wave typical of the fiber.

$$U = \frac{\sigma_{max}\varepsilon_{max}}{2\rho}\sqrt{\frac{E}{\rho}}$$

In practice, it is necessary to try to absorb the maximum energy by exploiting the capacity of the fiber to absorb elastic energy (which in turn depends on tensile strength and elongation at break) and likewise to try to transport energy away from the projectile impact zone as soon as possible (linked to the speed of the acoustic wave in the fiber); it is precisely for this reason that in present day textile structures each layer of unidirectional fibers is rotated by 90° with respect to the previous layer; in this way the energy is moved away from the impact point of the projectile as quickly as possible.

To increase the ballistic response of a structure it is therefore necessary to have a fiber with high tensile strength, high elongation, low density and a high elastic modulus.

As mentioned in the lines above, UD and Multiaxial fabrics require the application of resins that guarantee the stability of the structure and the greatest possible ability to hold the fibers in position during the ballistic event.

Cunniff's formula is still valid in the case of a layer composed of fibers and resin, but must take into account the fact that, for the same mass, some of the fabric has been replaced by resin, which in fact decreases the tensile strength of the fiber, its elastic modulus and consequently the velocity of the energy-absorbing sonic wave. This has been verified experimentally.

It is well known that resins increase the delamination surface area by keeping the fibers in a position in which they act together; if the difference between the properties of the fiber and the resin is too great, the two materials work in a totally uneven way, thus decreasing the ballistic stopping capacity of the structure. In this case, the resin prevents the yarn fibers from working properly.

A person skilled in the art might be inclined to reduce the amount of resin to remedy this problem, but this creates two problems:
- the quantity of resin must be reduced so much that the structure is not sufficiently cohesive;
- the films that are currently produced cannot be less than 6 g/m² in depths of more than 100 cm, whereas the depth of the fabrics is typically 160 cm.

In addition to the above, in warp and multi-axial weft UD type fabrics it has been found that the lighter the single unidirectional layer is, the higher the V50 value, and that trauma is lower if relative movement of the fibers in the two adjacent layers that are rotated with respect to each other is limited. Also documents US2016/377387, US2012/312151, US2012/088062 and CN207263031 disclose examples of ballistic structures according to available prior art.

OBJECT OF THE INVENTION

The main object of this invention is to provide a ballistic protection element that reduces the disadvantages in the known art.

SUMMARY OF THE INVENTION

In accordance with the present invention, this result has been accomplished through the creation of a ballistic laminate for ballistic protection, the laminate comprising at least one first unidirectional textile sublaminate and at least one second unidirectional textile sublaminate, the at least first and at least second textile sublaminate each comprising a first textile layer with a first plurality of ballistic fibers arranged in an a direction, and a second textile layer comprising a second plurality of ballistic fibers arranged substantially in the same a direction, the first and second textile layers of each sublaminate being separated by a non-ballistic connecting layer, the at least first and at least second textile sublaminate being in direct contact with each other and arranged in such a way that the fiber direction of the first sublaminate and the fiber direction of the second sublaminate form an angle of 90° +/−10° relative to each other. The unidirectional textile layers are preferably pre-impregnated by a resin matrix comprising one or more of the following materials: acrylic, polyethylene, polybutene, polyurethane, or block copolymer based resins. The protective layer separating the first and second textile layers of each sublaminate comprises one or more of the following materials: polyurethane, polyester, polyamide, polyethylene or polypropylene in the form of a (preferably adhesive) film or other structure.

According to a preferred embodiment, the ballistic fibers are made of aramid material, ultra high molecular weight polyethylene material known as UHMWPE, copolyaramid polybenzoxazolic or polybenzothiazolic material, liquid crystal, glass, carbon, etc., also admixed with each other. Preferably the ballistic laminate comprises a plurality of through holes having a diameter between 0.02 mm and 3 mm, the through holes passing through the first and second sub-laminate and having a density between 0.5 and 10 per cm².

Preferably the first and second textile sublaminate are joined together by pressing. The through holes, when present, are preferably made after the pressing stage. In a preferred embodiment the first and second textile sublaminates are joined together by stitching. At least some of the through holes may be made during the stitching stage. The stitching is preferably performed using needles of diameter at least 20% larger than the thread used for stitching. Alternatively the holes may be drilled by means of a system equipped with a roller or cylinder with a plurality of punches to create the holes while the roller (or cylinder) is rolling on the laminate.

The weight of each textile element is preferably between 10 g/m² and 500 g/m². In a second aspect of the present invention, a process for producing a ballistic laminate as described above is provided. The production process comprises the steps of:
- placing at least a first unidirectional textile layer, an adhesive film and at least a second unidirectional textile layer in contact with each other in such a way that the adhesive film is placed between the textile layers and holds them together. The first and second textile layers comprise a plurality of ballistic fibers arranged in substantially the same direction (+/−) 10°;
- joining the at least first textile layer, the adhesive film and the at least second textile layer together by pressure, resulting in a textile sublaminate;
- placing a first textile sublaminate and a second textile sublaminate in contact with each other so that the direction of the fibers of the first textile sublaminate and the direction of the fibers of the second textile sublaminate are at an angle of 90°+/−10° with respect to each other;
- joining the at least first and at least the second textile sublaminates together at a pressure between 1 and 200 bar.

According to another aspect of the present invention there is provided ballistic protection including at least one layer of ballistic laminate described above.

According to a further aspect of the present invention there is provided a hybrid ballistic package comprising at least one ballistic laminate, as described above, based on UHMW polyethylene fibers with a tenacity of more than 30 cN/dtex, a modulus of more than 120 Gpa and elongation of more than 2%, and at least one layer of aramid copolymer-based fabrics with a fiber tenacity of more than 26 cN/dtex, a modulus of more than 100 Gpa and elongation of more than 2% so that: —the specific energy absorbed for a 55 gr fsp is above 35 j/kg/m$^2$; —the ratio between the V50 obtained using a .44 Magnum Speer HP projectile according to standard NIJ0.101.06 for a package weighing less than 4.6 kg/m$^2$ and the maximum trauma recorded according to the same NIJ0.101.06 standard is greater than or equal to 11 (m/s)/mm. According to a preferred embodiment, when through holes are present they will have a diameter of between 0.02 mm and 3 mm. Preferably the number of through holes per cm$^2$ will be between 0.5 and 10.

With a structure according to the present invention, ballistic performance superior to existing products on the market is obtained, together with high flexibility, durability and stability over time.

BRIEF DESCRIPTION OF THE FIGURES

These and further advantages, objects and characteristics of the present invention will be better understood by a person skilled in the art from the description below and the attached drawing relating to embodiments of an illustrative character, but not to be understood in a limiting sense, in which.

DETAILED DESCRIPTION

According to a preferred embodiment of the present invention there is provided a structure comprising a plurality of unidirectional ballistic yarn sublaminates. Each sublaminate comprises at least two unidirectional ballistic layers having substantially parallel fibers, i.e. oriented in the same direction; the two ballistic layers with parallel fibers are not in direct contact with each other, but are separated (and held together) by means of a layer consisting for example of a film, which may be adhesive.

The sublaminates are then joined together so that the unidirectional fibers of each sublaminate are substantially perpendicular to those of the adjacent sublaminate.

Figure 1:
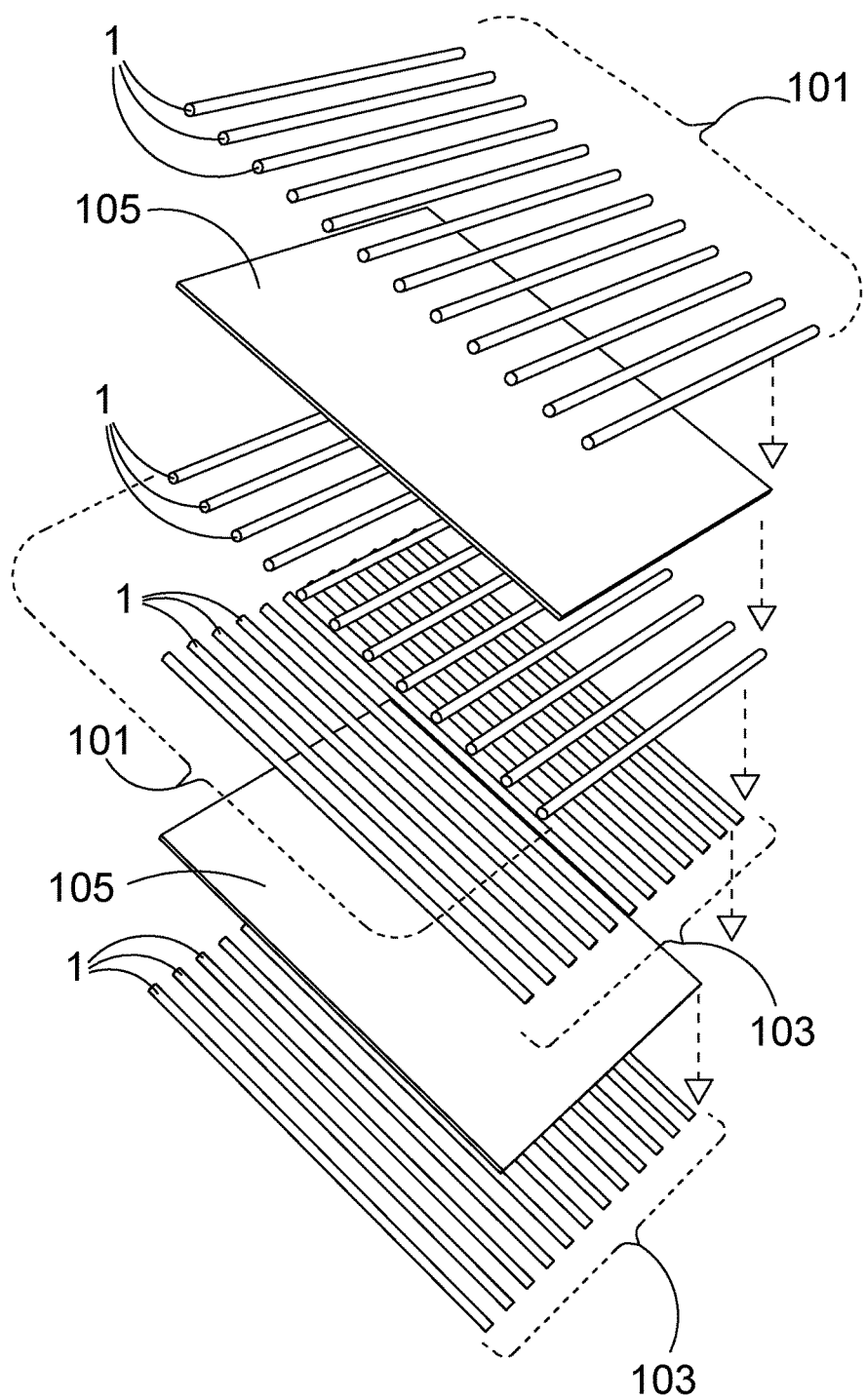
FIG. 1 shows a perspective view of a structure for ballistic protection according to a possible embodiment of the present invention, before the holes are drilled.

As shown in FIG. 1 the structure comprises an overlapping of layers composed as follows:

layer 101 of unidirectional fibers in direction α (e.g.) 0°, preferably impregnated with a matrix (e.g. a matrix having a low modulus and high elongation);

layer 105 of adhesive polymer structure, such as film, mesh, etc.;

unidirectional fiber layer 101 in direction α (parallel and NOT in the β direction (in the present example) 90°, perpendicular to the α direction, as in solutions in the known art) impregnated with a matrix (for example having a low modulus and high elongation);

unidirectional fiber layer 103 in direction β perpendicular to direction α;

layer 105 of adhesive polymeric structure such as film, mesh, etc.;

unidirectional fiber layer 103 in the β direction (and NOT in the α direction perpendicular to the β direction) impregnated with a matrix.

In the structure in FIG. 1 the three upper layers 101, 105 and 101 constitute the first sublaminate with fibers (of layers 101) all oriented in the same direction α; the three lower layers 103, 105 and 103 constitute the second sublaminate in which the ballistic fibers (of layers 103) are all oriented in the β direction perpendicular to α.

One characteristic of this structure is that the unidirectional ballistic fiber layers are arranged so that they form sub-sets of layers (in our example pairs, but could be more than two) with parallel fibers (first layer 101 with second layer 101; first layer 103 with second layer 103) and the parallel pairs are separated by adhesive elements (e.g. adhesive films) 105. On the contrary, the pairs of adjacent layers with fibers perpendicular to each other (second layer 101 and first layer 103, preferably impregnated with a matrix), in a preferred embodiment of the present invention are in direct contact with each other, without a protective film in between. This characteristic of direct contact increases the ballistic performance of the structure.

Figure 2:
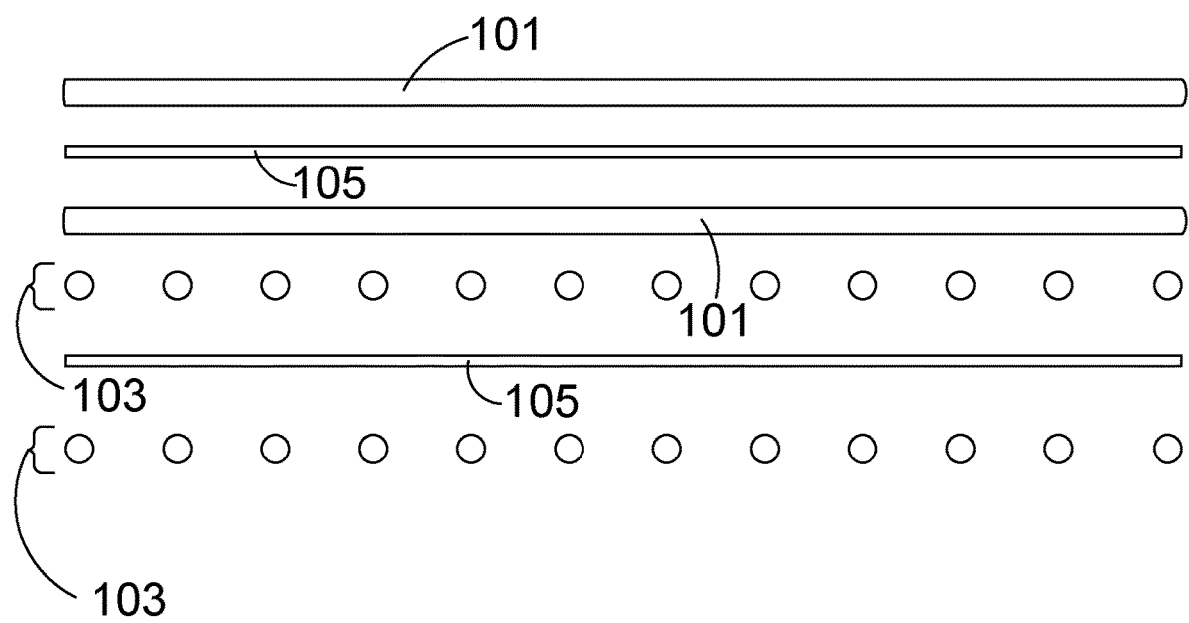
FIG. 2 shows a side view of the structure in FIG. 1.

For simplicity in this description we refer to precise measurements and definitions (e.g. 0° and 90° or parallel and perpendicular), but for the purposes of this invention it is intended that such measurements and definitions should be taken with a certain degree of approximation, so 0° means 0°+/−10°; 90° means 90°+/−10°, parallel means "substantially parallel" and perpendicular means "substantially perpendicular". FIG. 2 shows the same structure as FIG. 1 in side view where the sequence of layers (101+105+101+103+105+103) can be seen and once again shows that the adhesive film separates the layers with fibers parallel to each other (or rather substantially parallel), but not those with fibers perpendicular to each other (substantially perpendicular).

The ballistic layers according to a preferred embodiment of the present invention are made of ballistic yarns arranged unidirectionally in the directions indicated above. Small plates or monofilaments may be used as an alternative to yarns generally composed of numerous filaments. The yarn counts of these yarns (plates, monofilaments) are advantageously between 20 and 6500 d/tex, their tenacity is higher than 10 cN per d/tex, the modulus is higher than 40 GPa and tensile elongation is between 1% and 10%; for example, aramid yarns produced by Teijin®, DuPont®, Kolon®, Hyousung®, with the trade names of Twaron®, Kevlar®, Heracron®, Alkex®, belong to these classes.

In addition to aramid yarns, ultra-high molecular weight P.E. yarns may be used, for example those produced by Honeywell®, DSM®, with the trade names Spectra® and Dyneema® respectively, also in the form of plates known under the trade names Tensylon® or Endumax®. Recently copolyaramide yarns have been introduced under the names of Ruslan®, Rusar®, Autx®, Artec, produced by Kamenksvolokno®. These yarns are characterized by a dynamic tensile strength of at least twice the static strength, thus allowing high ballistic performance.

Preferably, the layers of ballistic yarns that make up the ballistic structure according to the present invention are pre-impregnated with thermoplastic and thermosetting resins, including mixtures thereof; the mechanical nature of these resins can be elastomeric, plastomeric, visco-elastic, etc. Among these, acrylic polyethylene, polybutenic, polyurethane resins based on block copolymers (styrene-butadiene-styrene type), also known by the commercial term Kraton®, are particularly useful. The quantities applied are between 3% and 30%. The purpose of applying the resin is to facilitate adhesion between the various layers of unidirectionally deposited and superimposed yarns. In addition, the resins put the various fibrils of the yarns in close contact, creating a continuity useful for ballistic purposes. As described above, additional elements (105) are applied between each pair of unidirectional "parallel" ballistic layers (e.g. 101 and 101 in FIG. 1 and FIG. 2) in order to stabilize the structure and protect the yarn fibrils from a mechanical action resulting from the mutual rubbing of the layers during use. Elements 105 may also be discontinuous films, felts, mesh and non-woven fabrics.

The composition of these layers 105 (e.g. film) must allow adhesion between the layers. Thus elements based on thermoplastic and thermosetting polymers, including mixtures thereof, are used. The mechanical nature of these resins may be elastomeric, plastomeric, viscoelastic, etc. Polyethylene, polyurethane, polycarbonate, polyamide, polypropylene and polyester films, also in the form of copolymers, are for example particularly useful. Advantageously the weights of these additional elements should be as low as possible, ideally around 3 g/m². The structure thus obtained is subjected to the action of pressure and temperature. The pressures are advantageously between 2 and 200 bar and more advantageously between 20 and 40 bar. The pressing temperatures are between 20° and 200° C. and more advantageously between 30° and 110° C. The pressure/temperature combination is applied using processes known to those skilled in the art and may be both continuous and discontinuous. The laminate so obtained undergoes a further process phase comprising creating discontinuities throughout the entire structure of the laminate.

Ballistic tests have shown that for the same mass of ballistic protection the better? performance is obtained the lower the weight of the single layer of protection.

The ideal ballistic structure should therefore have the following characteristics:
1. fiber with high tensile properties (high tenacity, high elongation, high modulus)
2. a single layer of limited weight,
3. suitable resin impregnating the individual unidirectional fibers
4. low-weight film placed between adjacent layers with fibers parallel to each other to limit relative movement between the fibers of adjacent layers having a tenacity of at least 20 MPa and an elongation at break of more than 500%, for example ballistic fabric of total weight 100 g/m², comprising 4 unidirectional layers of about 22 g/m², between which a 3 g/m² film is placed.

As mentioned above, the best way to block movement between the fibers of the adjacent layers with fibers parallel to each other during use is to use an adhesive film. While the single layer can be made almost as light as desired, the film has limits to lightness beyond which it is not possible to go because of production problems.

The invention described above can be used to produce unidirectional fiber layers of any low weight connected to each other for example by means of film; the film connecting the unidirectional layers which are not rotated with respect to each other offers a weak interaction in comparison with the situation where the film is placed between layers rotated with respect to each other; contrary to what might be imagined this "weak" interaction effect is positive.

Film stabilization of the unidirectional fiber layers that are not rotated also makes it possible to avoid the further application of film on the outer surfaces of the final structure as strength is guaranteed by the film (or other separating element) itself present between the layers.

The structure described above, which is theoretically contrary to the normal rules of construction according to the techniques in the known art, instead offers performance that combines high V50 and low trauma.

Figure 3:
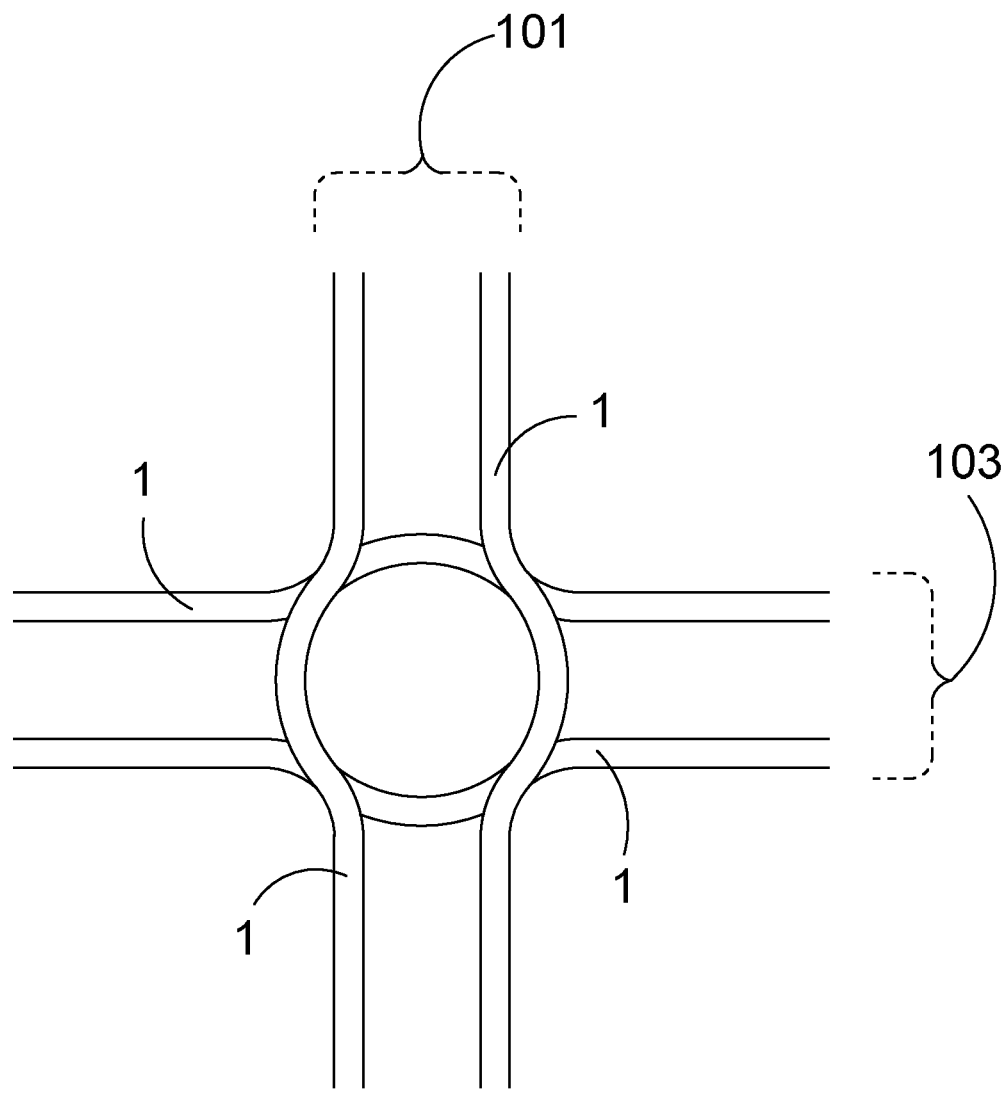
FIG. 3 diagrammatically illustrates the inflection (or discontinuity) in the straight line direction of the unidirectional fibers caused by the through holes.

If through holes passing through the entire structure are made in order to give greater flexibility to the unidirectional laminated structure, undulations and therefore inflections (or discontinuities) in the straight course of the ballistic yarns are created, as shown in FIG. 3. It has been surprisingly established that the flexibility characteristics of the structure are greatly improved through the presence of these inflections, as are the breathability characteristics, without compromising the ballistic characteristics in terms of both stopping power and magnitude of trauma induced by the impact energy. The number of these through holes and their diameter can be adapted to the needs of each individual structure (to increase or decrease flexibility and breathability). Advantageously, the holes preferably have a substantially circular shape (but may also be of other, for example elliptical, shapes); in a preferred embodiment of the present invention the diameter of these holes is between 0.02 mm and 3 mm, preferably between 0.5 and 2 mm. The number of such through holes (i.e. their density) is preferably between 0.1 and 10 per cm², more preferably between 0.5 and 10 per cm².

In a preferred embodiment, the various layers of the laminate are stitched together and it is precisely the stitching operation that creates the through holes.

It is preferable that the diameter of the stitching thread be 20% to 90% smaller than the diameter of the through holes created by the needle or latch that provides this type of stitching. This stitching thread is selected according to the structure and weight of the laminate to be made. The stitching thread count is advantageously between 20 d/tex and 300 d/tex. Threads based on organic polymers such as polyester, polyamides, polyethylene, polypropylene, or inorganic threads such as basalt, carbon, glass, are used. The nature of the stitching is not decisive for the performance of the laminate. In some cases, when the diameter of the stitching thread is much smaller than the diameter of the hole/channel created and especially with certain types of stitching, the thread is not locked and therefore easily "removable", thus ceasing to play its part. In this case, a two-component monofilament is used for the stitching itself, in which the outer part can be melted more easily than the inner part, the melting point of which is much higher so that it remains intact during the pressing stage at its temperature. In a preferred form of embodiment, the needles (e.g. the crochet) are fed by non-ballistic threads that pass perpendicularly through all the layers of the laminate, thus increasing the cohesion between the various layers of the laminate after being properly knotted with a knitted or chain knot.

The length of the binding stitch is advantageously between 1 and 20 mm and the distance between the various stitching threads in the longitudinal direction is advantageously between 1 and 20 mm.

Devices and machines known to those skilled in the art, which may possibly be suitably modified, such as quilting machines or multiple head sewing machines, may be used to make the seams.

As mentioned, stitching of the structure is optional and is not necessarily linked to the existence of the through holes described above. The presence of the through holes, which can be obtained by alternative methods if there is no stitching operation, nevertheless provides the above-mentioned advantages of increased flexibility and breathability. One of the alternative methods for making the through holes and the relative discontinuities in the rectilinear direction of the fibers (i.e. without the stitching stage) consists of subjecting the laminate to the action of a series of punches placed on a rotating cylinder suitably loaded to exert the pressure needed to perforate the laminate so that the punches penetrate through the entire thickness of the laminate. In an optional embodiment of the present invention, it is also possible for the two techniques, i.e. both stitching and punching (or other technique to produce through holes), to coexist: in this case some holes will have the stitching thread within them, while others will not.

For a better description of the contents of this invention, FIG. 3 shows the undulation that is created in the yarn placed unidirectionally following penetration by the needle, punch or latch. The creation of these discontinuities must not cause any damage to the ballistic fibers. The punches, crochets or needles that create such discontinuities must not therefore have sharp edges or sharp parts, but must be suitably rounded.

The structure of the laminate comprises at least two sublaminates, each comprising a pair of layers of prepreg yarns, the individual layers having the fibers parallel to each other and separated from each other by a protective film; the at least two sublaminates are superimposed, with the direction of the unidirectional yarns in each sublaminate oriented at an angle of 90°+/−10° with respect to the adjacent sublaminate.

In a preferred embodiment, the number of layers of a single laminate is 4 (two for each sublaminate), but may also be greater, for example any multiple of 2, for example 8.

Ballistic protection made from laminate according to the present invention may include a variable number of laminate structures described above, preferably ranging from a minimum of 1 to a maximum of 50.

The structure which is the subject matter of the present invention may be further improved by applying an additional treatment that drastically increases the flexibility of the structure; this improvement is caused by an ordered reduction in thickness along the entire length of the piece, created during the optional stage of stitching the layers together.

These reductions in thickness may be in the same direction as the piece or at 45° to the direction of the length of the piece or a combination thereof.

The best performance is obtained when the reductions in thickness are discontinuous, interrupted by holes in which binding elements e) are inserted; these holes also have the valuable effect of deflecting from the straightness of the ballistic fiber, having a favorable effect on the elongation at break of the fiber itself and increasing its ballistic properties (Cunniff's formula on elongation).

The channels have a width of between 0.1 and 1 mm and a length of between 1 and 30 mm.

The reduction in thickness is obtained by passing the assembly through a further pressing in which the stitching thread makes an impression in the fabric leaving a channel. The pressing creates a reduction in thickness alternating with holes through which thread e) is threaded. Effectively an alternation of channels/threaded holes.

In the case of unidirectional polyethylene-based fiber layers, for this to happen it is necessary that the binding element should have a higher softening temperature than the ballistic fiber and that the ballistic fiber should allow itself to be deformed plastically.

It is also preferable that there should be no adhesion between the binding element and the reduction in thickness (otherwise ballistic fibers are locked) and that there should be adhesion between the film positioned between the two adjacent layers of unidirectional fibers directed in the same direction and the binding element. This ensures that the binding element is cohesive with the structure and cannot slip out during subsequent cutting into vest shapes.

The invention claimed is:

1. A ballistic laminate for ballistic protection, the laminate comprising: at least a first unidirectional textile sub-laminate and at least a second unidirectional textile sub-laminate, each of the at least first and the at least second textile sub-laminates comprising a first textile layer having a first plurality of ballistic fibers arranged in a direction α and a second textile layer comprising a second plurality of ballistic fibers arranged substantially according to the same direction α, the first and second textile layers of each sub-laminate being separated by a non-ballistic connecting layer interposed between the first and second textile layers, the at least first and the at least second sub-laminate being in direct contact with each other and arranged so that the direction of the fibers of the at least first sub-laminate and the direction of the fibers of the at least second sub-laminate form a relative angle of 90°+/−10°.

2. The ballistic laminate according to claim 1, wherein the textile layers are pre-impregnated by a matrix of resin comprising one or more of the following materials: acrylic, polyethylene, polybutene, polyurethane resins based on block copolymers.

3. The ballistic laminate according to claim 1, in which the connecting layer comprises one or more of the following materials: polyurethane, polyester, polyamide, polyethylene, polypropylene, in the form of a film.

4. The ballistic laminate according to claim 1, wherein the ballistic fibers comprise one or more of the following materials: aramid, polyamide, high-molecular-weight polyethylene UHMWPE, copoliaramidic, polybenzoxazole, polybenzothiazole, liquid crystals, glass, carbon.

5. The ballistic laminate according to claim 1, comprising a plurality of through holes having a diameter between 0.02 mm and 3 mm, the through holes passing through the at least first and the at least second sub-laminates and having a density between 0.5 and 10 per $cm^2$.

6. The ballistic laminate according to claim 1, wherein the at least first and the at least second sub-laminate are joined to each other by means of a pressing action.

7. The ballistic laminate according to claim 6 wherein a plurality of through holes are made after the pressing action.

8. The ballistic laminate according to claim 5 wherein the at least first and the at least second sub-laminates are joined together by means of sewing and at least part of the through holes are made during the sewing.

9. The ballistic laminate according to claim 8, wherein a seam is made by means of needles having a diameter at least 20% greater than the diameter of the yarn used for sewing.

10. A ballistic protection article comprising at least one ballistic laminate of claim 1.

11. Process of manufacture of a ballistic laminate of claim 1, comprising the steps of:
arranging at least a first unidirectional textile layer, a connecting element and at least a second unidirectional textile layer in contact with one another so that the connecting element is interposed between the textile layers and keeps them joined together, the first and the second textile layer comprising a plurality of ballistic fibers disposed substantially in the same direction (+/−) 10°;
joining the at least first textile layer, the connecting element and the at least second textile layer to each other by pressure, obtaining a textile sub-laminate;
arranging a first textile sub-laminate and a second textile sub-laminate in contact with one another so that the direction of the fibers of the first textile sub-laminate and the direction of the fibers of the second textile sub-laminate have a relative angle of 90°+/−10°;

joining the at least first sub-laminate and the at least second sub-laminate together by means of a pressure between 1 and 200 bar.

12. A hybrid ballistic package comprising: at least one ballistic laminate according to claim 1 based on polyethylene UHMW fibers with a tenacity higher than 30 cN/dtex, a modulus higher than 120 Gpa and an elongation higher than 2%; and at least one layer of aramid copolymer-based fabrics having fiber tenacity greater than 26 cN/dtex, a modulus greater than 100 Gpa and an elongation greater than 2% so that:

the specific energy absorbed with 55 grs fsp is higher than 35 j/kg/m$^2$ the ratio between the V50 with .44 Magnum Speer HP bullet according to the NIJ0.101.06 standard of a package weighing less than 4.6 kg/m$^2$ and the maximum trauma recorded according to NIJ0.101.06 standard is higher or equal to 11 (m/s)/mm.

\* \* \* \* \*